(12) United States Patent
Matsuda et al.

(10) Patent No.: US 11,642,708 B2
(45) Date of Patent: May 9, 2023

(54) USED PAPER DIAPER PROCESSING APPARATUS

(71) Applicant: Panasonic Corporation, Osaka (JP)

(72) Inventors: Genichiro Matsuda, Nara (JP); Hidenao Kataoka, Osaka (JP); Naofumi Hino, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 412 days.

(21) Appl. No.: 16/794,970

(22) Filed: Feb. 19, 2020

(65) Prior Publication Data

US 2020/0269292 A1    Aug. 27, 2020

(30) Foreign Application Priority Data

Feb. 25, 2019   (JP) .............................. JP2019-031505

(51) Int. Cl.
*B09B 3/00*   (2022.01)
*B09B 5/00*   (2006.01)
(Continued)

(52) U.S. Cl.
CPC .................. *B09B 5/00* (2013.01); *B04B 3/00* (2013.01); *B04B 11/04* (2013.01); *B09B 3/00* (2013.01);
(Continued)

(58) Field of Classification Search
CPC ........... B09B 3/0075; B09B 3/00; B09B 5/00; B09B 2101/02; B09B 2101/67;
(Continued)

(56) References Cited

U.S. PATENT DOCUMENTS

| 5,268,105 A | 12/1993 | Uejima et al. |
| 6,478,724 B1 | 11/2002 | Beattey |

(Continued)

FOREIGN PATENT DOCUMENTS

| CN | 1518481 | 8/2004 |
| CN | 1899715 | 1/2007 |

(Continued)

OTHER PUBLICATIONS

Extended European Search Report dated Jul. 10, 2020 in European Application No. 20158456.2.

(Continued)

*Primary Examiner* — Yan Lan
(74) *Attorney, Agent, or Firm* — Wenderoth, Lind & Ponack, L.L.P.

(57) ABSTRACT

Provided is a used paper diaper processing apparatus in which a water absorption function of a superabsorbent polymer that absorbs water contained in excrement is lowered and water is removed by mixing the superabsorbent polymer and a chemical containing divalent metal ions in an outer tank, and in which weight is reduced by dehydration after an amount of water contained in a used paper diaper is lowered. In the apparatus, a lower portion of the outer tank can be opened and closed, so that weight reduction processing and a series of operations including taking-out are possible. Since an operator is not required to take out the used paper diaper after processing directly from the outer tank, it is possible to reduce work and hygiene burdens on the operator.

2 Claims, 7 Drawing Sheets

(51) Int. Cl.
*B04B 3/00* (2006.01)
*B04B 11/04* (2006.01)
B09B 101/67 (2022.01)
B09B 101/02 (2022.01)

(52) U.S. Cl.
CPC ......... *B09B 3/0075* (2013.01); *B09B 2101/02* (2022.01); *B09B 2101/67* (2022.01)

(58) Field of Classification Search
CPC ..... B09B 3/0016; B09B 3/0058; B04B 11/04; B04B 3/00; B29L 2031/4878
See application file for complete search history.

(56) References Cited

U.S. PATENT DOCUMENTS

| 10,066,331 | B2 | 9/2018 | Hendrickson et al. |
| 2003/0019961 | A1 | 1/2003 | Hohnen et al. |
| 2004/0209753 | A1 | 10/2004 | Kikushima et al. |
| 2015/0265737 | A1 | 9/2015 | Yamaguchi et al. |
| 2020/0269292 | A1 | 8/2020 | Matsuda et al. |

FOREIGN PATENT DOCUMENTS

| CN | 104582866 | 4/2015 |
| CN | 109290279 | 2/2019 |
| EP | 0 378 927 | 7/1990 |
| EP | 0 545 520 | 6/1993 |
| EP | 1 415 733 | 5/2004 |
| EP | 3 237 665 | 11/2017 |
| JP | 5-154188 | 6/1993 |
| JP | 6-269746 | 9/1994 |
| JP | 7-291405 | 11/1995 |
| JP | 8-168587 | 7/1996 |
| JP | 2001-104929 | 4/2001 |
| JP | 2002-292304 | 10/2002 |
| JP | 2003-019169 | 1/2003 |
| JP | 2003-191169 | 1/2003 |
| JP | 2003-190928 | 7/2003 |
| JP | 2004-514557 | 5/2004 |
| JP | 3840383 | 11/2006 |
| JP | 3895081 | 3/2007 |
| JP | 2008-35925 | 2/2008 |
| JP | 2008-307445 | 12/2008 |
| JP | 2010-84031 | 4/2010 |
| JP | 4685973 | 5/2011 |
| JP | 2012-81433 | 4/2012 |
| JP | 2012-225516 | 11/2012 |
| JP | 2013-236989 | 11/2013 |
| JP | 2014-155903 | 8/2014 |
| JP | 2018-167153 | 11/2018 |
| JP | 2019-81131 | 5/2019 |
| JP | 2019-136662 | 8/2019 |
| JP | 2019-206656 | 12/2019 |
| JP | 2020-131157 | 8/2020 |
| KR | 20030017286 | 3/2003 |
| RU | 2 105 593 | 2/1998 |
| WO | 94/20668 | 9/1994 |
| WO | 02/072271 | 9/2002 |
| WO | 2013/144336 | 10/2013 |

OTHER PUBLICATIONS

Extended European Search Report dated Feb. 17, 2021 in European Application No. 20196180.2.
Notification of Reasons for Refusal dated Apr. 5, 2022 in Japanese Patent Application No. 2019-169943, with English-language translation.
Extended European Search Report dated May 10, 2021 in European Application No. 20209962.8.
Notification of Reasons for Refusal dated May 25, 2021 in Japanese Application No. 2019-031505 with English translation.
Extended European Search Report dated Jun. 17, 2021 in European Application No. 21150076.4.
Chinese Office Action including Chinese Search Report dated Oct. 27, 2021 in corresponding Chinese Patent Application No. 202010105696.X with Partial English translation of Chinese Office Action and Full English translation of the Chinese Search Report.
Office Action and Search Report dated Jun. 17, 2022 in corresponding Chinese Patent Application No. 202110072028.6, with English language translation.
Notification of Reasons for Refusal dated Jun. 21, 2022 in Japanese Application No. 2020-007638 with English translation thereof.
Notification of Reasons for Refusal dated May 27, 2022 in Chinese Application No. 202010991823.0 with partial English translation thereof.
Office Action dated Dec. 7, 2022 in U.S. Appl. No. 17/144,311.
Office Action dated Dec. 16, 2022 in Chinese Patent Application No. 202010991823.0, with English-language translation.

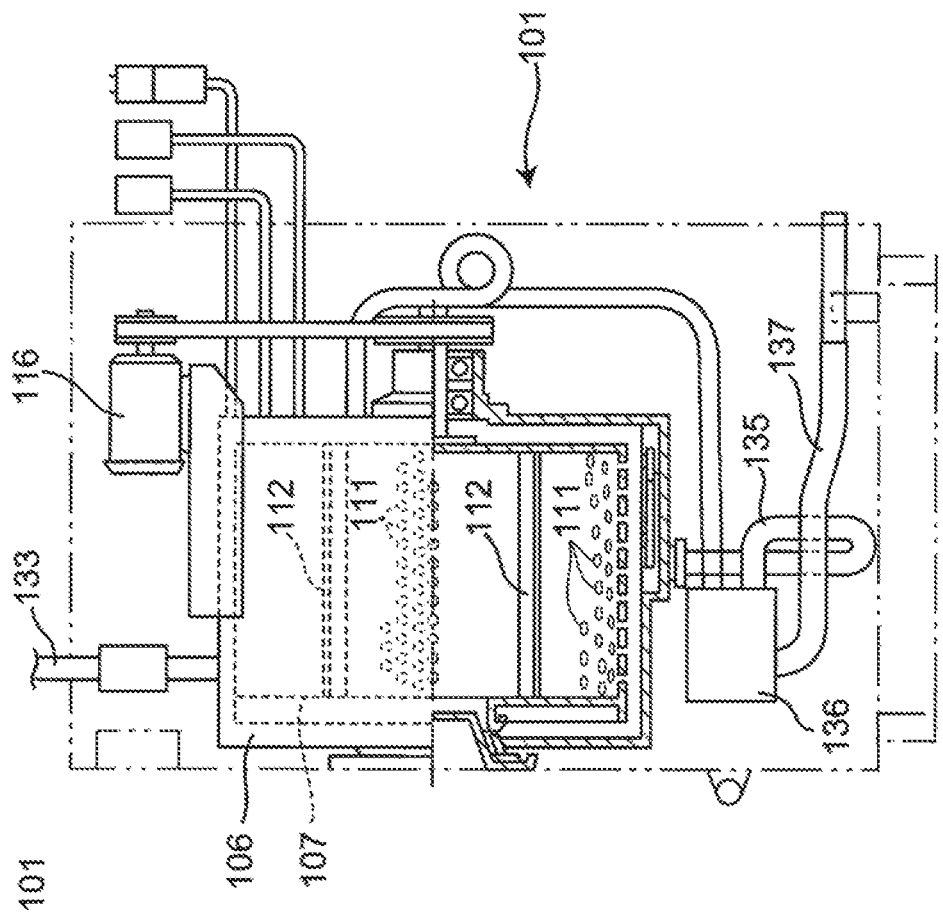
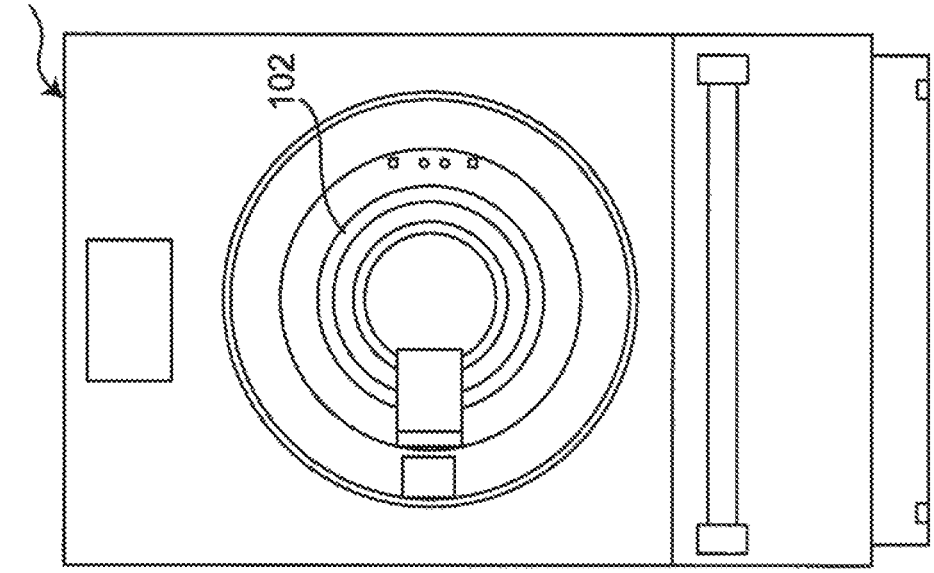

USED PAPER DIAPER PROCESSING APPARATUS

BACKGROUND OF THE INVENTION

Field of the Invention

The present disclosure relates to a used paper diaper processing apparatus that reduces weight by removing water from a superabsorbent polymer contained in a used paper diaper.

More specifically, the present disclosure relates to a used paper diaper processing apparatus in which a water absorption function of a superabsorbent polymer that absorbs water contained in excrement is lowered and water is removed by mixing the superabsorbent polymer and a chemical containing divalent metal ions, and in which weight is reduced by dehydration after an amount of water contained in a used paper diaper is lowered.

Description of the Related Art

Since a used paper diaper contains a large amount of water, when a large amount of used paper diapers is handled in a nursing home etc., weight of the paper diapers may be an issue. The paper diaper contains a superabsorbent polymer and can hold a large amount of water. Moreover, once the water has been absorbed by the superabsorbent polymer, it is difficult to remove the water as it is.

Therefore, a used paper diaper processing apparatus has been proposed in which a used paper diaper soaked in water is separated and disassembled into a water-soluble substance and an insoluble substance, and the separated and disassembled water-soluble substance is discharged to a sewage processing facility along with sewage, thereby reducing weight and volume of the paper diaper (see Patent Document 1).

FIGS. 6A and 6B shows an example of a conventional used paper diaper processing apparatus 101 described in Patent Document 1. FIG. 6A is a front view of the conventional used paper diaper processing apparatus 101, and FIG. 6B shows a side view thereof. In FIGS. 6A and 68, 102 indicates an opening/closing lid, 106 indicates an outer drum, 107 indicates a rotating drum, 111 indicates a through hole, 132 indicates a stirring protrusion, 116 indicates a motor, 133 indicates a water supply pipe, 135 and 137 indicate discharge pipes, and 136 indicates an opening/closing valve.

Next, operation of the conventional used paper diaper processing apparatus 101 will be described.

A used paper diaper is put into the rotating drum 107 after opening the opening/closing lid 102.

Next, after a predetermined amount of water (amount by which a lower portion of the rotating drum 107 is immersed) is supplied from the water supply pipe 133 into the outer drum 106, the motor 116 is started to rotate the rotating drum 107, and a water flow is generated inside the rotating drum 107. As a result, the paper diaper in the rotating drum 107 can be separated and disassembled while being immersed in the water. At this time, because of the stirring protrusions 112, stirring processing of the paper diaper is promoted, and separation and dismantling processing is promoted. The separated and dismantled paper diaper passes through the discharge pipes 135 and 137 via the through holes 111 and is drained to a sewer pipe connected to the sewage processing facility.

However, in the used paper diaper processing apparatus 101 described in Patent Document 1, the paper diaper is separated and disassembled in a processing step, and a fiber component of the disassembled paper diaper is directly discharged to the sewage processing facility. Accordingly, there is an issue that a load for processing the fiber component of the disassembled paper diaper increases in wastewater processing in the sewage processing facility. Therefore, upon discharging to the sewer pipe, it is necessary to introduce an apparatus for removing the fiber component of the dismantled paper diaper by a filter.

Therefore, as another processing system, a used paper diaper processing apparatus has been proposed in which water is removed from a superabsorbent polymer by reacting with a chemical containing divalent metal ions, thereby reducing weight of a paper diaper (see Patent Document 2).

FIGS. 7A-7D show an example of a conventional used paper diaper processing apparatus 201 described in Patent Document 2. In FIGS. 7A-7D, 202 indicates lime, 203 indicates hypochlorous acid, 204 indicates a processing tank, 205 indicates a used paper diaper, 206 indicates water, 207 indicates a liquid, and 208 indicates wastewater.

Subsequently, operation of the conventional used paper diaper processing apparatus 201 will be described.

First, as shown in FIG. 7A, the lime 202, the hypochlorous acid 203, and the used paper diaper 205 are put into the processing tank 204.

Next, as shown in FIGS. 7B and 7C, the water 206 is put into the processing tank 204 so that stirring is possible, and then the stirring is performed for a predetermined time. When the stirring is continued in this state, Ca ions contained in the lime react with the superabsorbent polymer of the paper diaper, and water contained in the superabsorbent polymer is removed.

Finally, as shown in FIG. 7D, the liquid 207 in the processing tank 204 is discharged out of the processing tank 204 and dehydrated, and then the wastewater 208 is discharged.

PRIOR ART DOCUMENTS

Patent Documents

Patent Document 1: Japanese Patent Laid-open Publication No. 2001-104929

Patent Document 2: Japanese Patent Laid-open Publication No. 2010-84031

However, in the used paper diaper processing apparatus 201 described in Patent Document 2, dehydration processing is performed after the water contained in the superabsorbent polymer is removed in the processing tank 204, and only the paper diaper remains in the processing tank 204. In order to take out the remaining used paper diaper, it is necessary for an operator to take it out from above. Also, it is necessary for the operator to refill the taken-out used paper diaper into a disposal bag such as a plastic bag. Accordingly, there is an issue that work and hygiene burdens are forced on the operator.

SUMMARY OF THE INVENTION

In view of such points, one non-limiting and exemplary embodiment provides a used paper diaper processing apparatus, in which a used paper diaper is stirred together with a chemical containing divalent metal ions, and dehydration processing is performed after water is removed by lowering a water absorption function of a superabsorbent polymer, so that an amount of water contained in the used paper diaper is lowered and weight is reduced. In the used paper diaper processing apparatus, by reducing the weight without separating and disassembling the paper diaper and by implementing a series of operations up to taking-out operation of the used paper diaper after the processing in the processing apparatus, work and hygiene burdens on an operator at a nursing home and the like are reduced without increasing a burden of wastewater processing in a sewage processing facility.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a used paper diaper processing apparatus, comprising:

a processing tank that processes a used paper diaper;
a liquid supply unit that supplies a processing liquid to the processing tank:
a liquid discharge unit that discharges the processing liquid from the processing tank; and
a take-out unit that takes out a paper diaper processed in the processing tank below the processing tank,
wherein the processing tank has a cylindrical inner tank that stores the used paper diaper and has a plurality of through holes smaller than the paper diaper on at least either a side surface thereof or a bottom surface thereof, and an outer tank that surrounds the side surface and the bottom surface of the inner tank,
the used paper diaper processing apparatus further comprising:
a rotation drive unit that rotates the inner tank around an axis of the inner tank; and
an opening/closing unit that discharges the paper diaper processed in the processing tank from a bottom of the processing tank to the take-out unit.

According to the used paper diaper processing apparatus according to the above aspect of the present disclosure, the bottom of the outer tank and the bottom of the inner tank can be opened and closed, the diaper after processing can be dropped and taken out from below, and it is possible to reduce work and hygiene burdens of an operator.

BRIEF DESCRIPTION OF THE DRAWINGS

These and other aspects and features of the present invention will become clear from the following description taken in conjunction with the embodiments thereof with reference to the accompanying drawings, in which:

FIGS. 6A and 6B are cross-sectional views of a conventional used paper diaper processing apparatus.

DETAILED DESCRIPTION

First Embodiment

Figure 1:
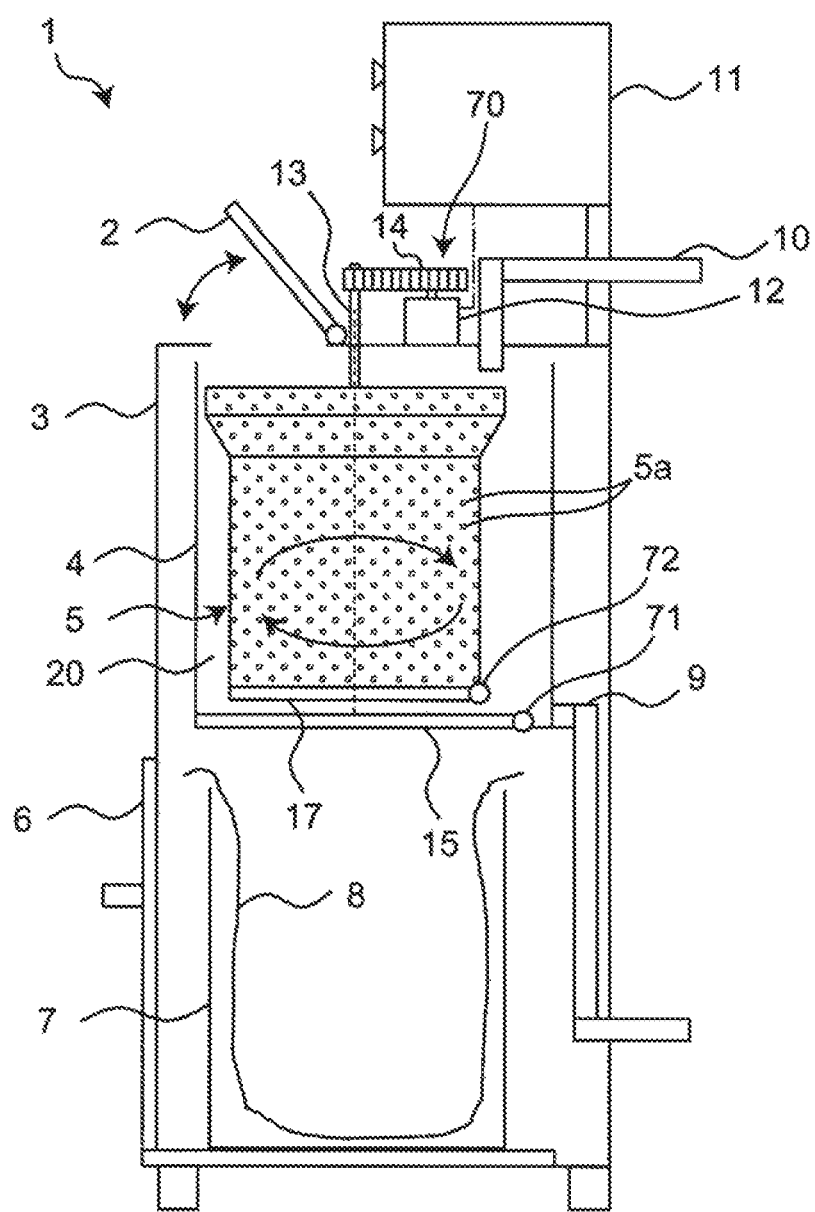
FIG. 1 is a side sectional view showing a configuration of a used paper diaper processing apparatus according to a first embodiment of the present disclosure.

Hereinafter, a used paper diaper processing apparatus 1 according to an embodiment of the present disclosure will be described in detail with reference to the drawings. In the drawings, the same or corresponding parts are denoted by the same reference numerals and description thereof will not be repeated. Note that, in order to make the explanation easy to understand, a configuration is shown in a simplified or schematic manner, or some constituent members are omitted in the drawings referred to below. Further, a dimensional ratio between the constituent members shown in each drawing does not necessarily indicate an actual dimensional ratio.

[Overall Configuration]

First, an overall configuration of the used paper diaper processing apparatus 1 will be described. FIG. 1 is a side sectional view showing a configuration of the used paper diaper processing apparatus 1 according to the first embodiment of the present disclosure.

The used paper diaper processing apparatus 1 includes at least a processing tank 20, a liquid supply unit 10, a liquid discharge unit 9, and a take-out unit 6. More specifically, the used paper diaper processing apparatus 1 further includes a loading door 2, an apparatus main body 3, a storage container 7, a disposal bag 8, a control apparatus 11, and a rotation drive unit 70.

The processing tank 20 for processing a used paper diaper is disposed in an upper portion of the apparatus main body 3, and includes, for example, a cylindrical outer tank 4 and a cylindrical inner tank 5. The inner tank 5 is disposed in the outer tank 4.

The loading door 2 is attached to the upper portion of the apparatus body 3 so as to be openable and closable. A used paper diaper is put into the inner tank 5 by opening the loading door 2.

The outer tank 4 is a container that can store water. Water can be stored by introducing water from the liquid supply unit 10 into the outer tank 4, and a chemical can be introduced from the liquid supply unit 10 into the outer tank 4. As a result, a processing liquid 19 can be supplied from the liquid supply unit 10 into the outer tank 4. Note that, as will be described in detail later, a processing liquid 19 in which water and a chemical are mixed can be supplied from the liquid supply unit 10 into the outer tank 4.

Further, the liquid in the outer tank 4 is discharged to the outside by using the liquid discharge unit 9. Inside the outer tank 4, the cylindrical inner tank 5 having a plurality of through holes 5a on at least either a side surface or a bottom surface is disposed.

Further, the inner tank 5 is rotatably connected to the rotation drive unit 70. The rotation drive unit 70 is driven under the control of the control apparatus 11. As an example, the rotation drive unit 70 includes a shaft 13 fixed to the inner tank 5 along a rotation axis of the inner tank 5, a belt 14 that engages with the shaft 13 and rotates the shaft 13, and a motor 12 having a rotating shaft to which a gear engaging with the belt 14 is fixed. Under the control of the control apparatus 11, the inner tank 5 can be rotated with respect to the outer tank 4 by driving the motor 12. As an example, the rotation axis of the inner tank 5 can be disposed along a vertical direction.

An outer tank bottom 15 and an inner tank bottom 17 can be opened and closed around the rotation axis by hinges 71 and 72 as an example of an opening/closing unit with respect to the outer tank 4 and the inner tank 5, respectively. The take-out unit 6 is disposed in a lower portion of the apparatus main body 3 below the outer tank bottom 15 and the inner tank bottom 17.

A processed paper diaper can be taken out from the take-out unit 6. Inside the take-out unit 6, the storage container 7 to which the disposal bag 8 is attached is placed. The disposal bag 8 is placed immediately below the inner tank bottom 17. By making an opening of the storage container 7 larger than an opening at a bottom of the inner tank 5, the processed paper diaper can be smoothly dropped into the disposal bag 8 of the storage container 7.

[Operation]

Next, operation of the used paper diaper processing apparatus 1 will be described. In the following, for convenience of explanation, a state in which stirring operation is performed after a used paper diaper 18 is put and placed in the inner tank 5 (FIG. 2) and a state in which the outer tank bottom 15 and the inner tank bottom 17 are opened and operation of taking out the used paper diaper 18 after processing to the take-out unit 6 is performed (FIG. 3) will be described separately.

Figure 2:
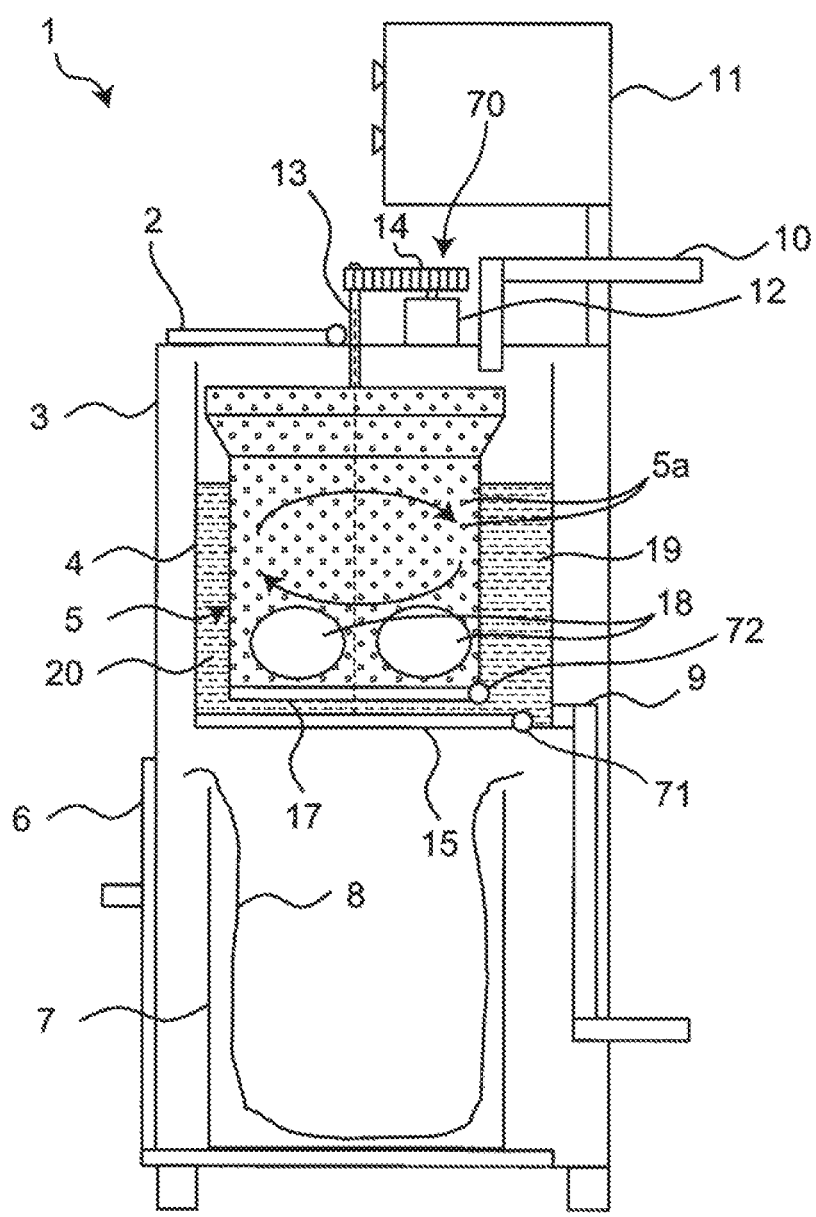
FIG. 2 is a side sectional view showing a state in which a used paper diaper is disposed in a processing tank and stirring operation is performed in the first embodiment of the present disclosure.

In FIG. 2, water is supplied from the liquid supply unit 10 into the outer tank 4 and a certain amount of water is stored in the outer tank 4.

Next, a chemical for lowering a water absorption function of a superabsorbent polymer is put from the liquid supply unit 10 into the outer tank 4 and mixed with the water already put in the outer tank 4. Thereby, the processing liquid 19 is stored in the outer tank 4. As the chemical for lowering the water absorption function of the superabsorbent polymer, a substance containing metal ions can be used as examples, and especially, calcium chloride, lime, or the like containing a divalent metal can be used.

Next, the used paper diaper 18 is put into the inner tank 5 from the loading door 2, and the motor 12 is rotationally controlled under the control of the control apparatus 11 to execute the stirring operation. Specifically, when the motor 12 rotates, the shaft 13 rotates via the belt 14, and the inner tank 5 rotates with respect to the outer tank 4. Thereby, the processing liquid 19 and the used paper diaper 18 are stirred. When the stirring operation is continued for a while, the superabsorbent polymer of the used paper diaper 18 and, for example, divalent metal ions in the chemical react with each other. Accordingly, water contained in the superabsorbent polymer is removed from the used paper diaper 18, and the removed water is mixed with the processing liquid 19. An example of time for which the stirring operation is continued depends on concentration of the calcium chloride, and water can be removed even at a minimum of 5 minutes. As an actual apparatus, time of about 10 to 30 minutes is practical. In the stirring operation here, the processing liquid 19 and the superabsorbent polymer of the used paper diaper 18 only need to react with each other. It is useful to perform gentle stirring under the control of the control apparatus 11 so that the used paper diaper 18 is not separated and disassembled by the stirring operation. For example, the gentle stirring is about 40 to 160 rpm.

By putting the used paper diaper 18 thereinto in a state in which the processing liquid 19 mixed with the chemical is stored in the outer tank 4, it is possible to prevent the used paper diaper 18 from expanding in the inner tank 5. If the used paper diaper 18 is put thereinto in a state in which only the water is stored and the processing liquid 19 containing the chemical is not stored, the superabsorbent polymer absorbs the water, and the used paper diaper 18 expands greatly. In this case, an issue that the number of used paper diapers 18 that can be put into the inner tank 5 at a time is limited and an issue that the inner tank 5 must be enlarged occur. On the other hand, when the processing liquid 19 mixed with the chemical is stored in the outer tank 4, the occurrence of these issues can be suppressed.

Next, after the liquid such as the processing liquid accumulated in the outer tank 4 is drained from the liquid discharge unit 9, the inner tank 5 is rotated at a high speed with respect to the outer tank 4. Thereby, the used diaper 18 can be dehydrated, and weight of the used paper diaper 18 can be reduced. An example of high-speed rotation is about 800 rpm and a maximum of about 1100 rpm.

Figure 3:
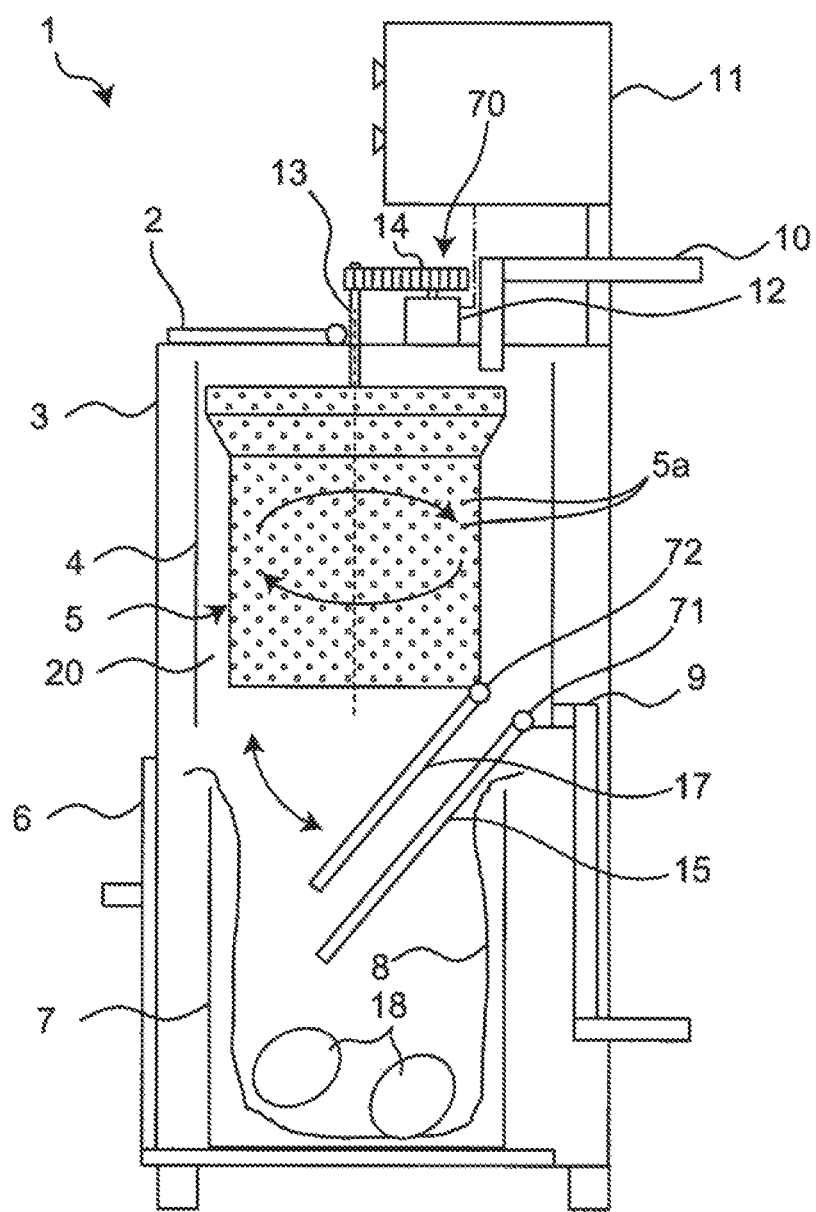
FIG. 3 is a side sectional view showing a state in which a bottom of the processing tank is opened and taking-out operation of a used paper diaper after processing is performed in the first embodiment of the present disclosure.

Next, taking-out operation of the used paper diaper 18 will be described with reference to FIG. 3. When the outer tank bottom 15 and the inner tank bottom 17 are opened via the hinges 71 and 72 in a state in which the dehydration is finished, the used paper diaper 18 falls into the disposal bag 8 installed in the storage container 7. When the used paper diaper 18 is discharged, the used paper diaper 18 can be discharged simply by taking out the take-out unit 6 from the apparatus main body 3 by sliding the take-out unit 6 laterally with respect to the apparatus main body 3, and taking out the disposal bag 8 from the storage container 7.

As described above, according to the first embodiment described above, the paper diaper 18 subjected to the weight reduction processing with the chemical containing metal ions or the like is not separated and disassembled in the processing tank 20, and a fiber portion remains in the paper diaper 18. Further, the processed paper diaper 18 does not need to be taken out directly by an operator from above the inner tank, and can be stored in the disposal bag 8 without bothering the operator. Therefore, work and hygiene burdens on the operator can be reduced.

Note that, in the first embodiment, the disposal bag 8 is installed in the storage container 7. However, the paper diaper 18 may be directly stored in the storage container 7 without installing the disposal bag 8.

In addition, instead of preparing the processing liquid 19 by putting the chemical containing metal ions and the like thereinto after the water is stored in the outer tank 4, a processing liquid 19 in which water and a chemical are mixed may be prepared in advance, and the prepared processing liquid 19 may be directly stored in the outer tank 4.

Further, the inner tank 5 can be directly driven by the motor 12 without using the belt 14 to rotate.

Second Embodiment

In the first embodiment, the outer tank bottom 15 and the inner tank bottom 17 are separated. However, by connecting the outer tank bottom 15 and the inner tank bottom 17, the used paper diaper 18 can be taken out by a simpler method.

Figure 4:
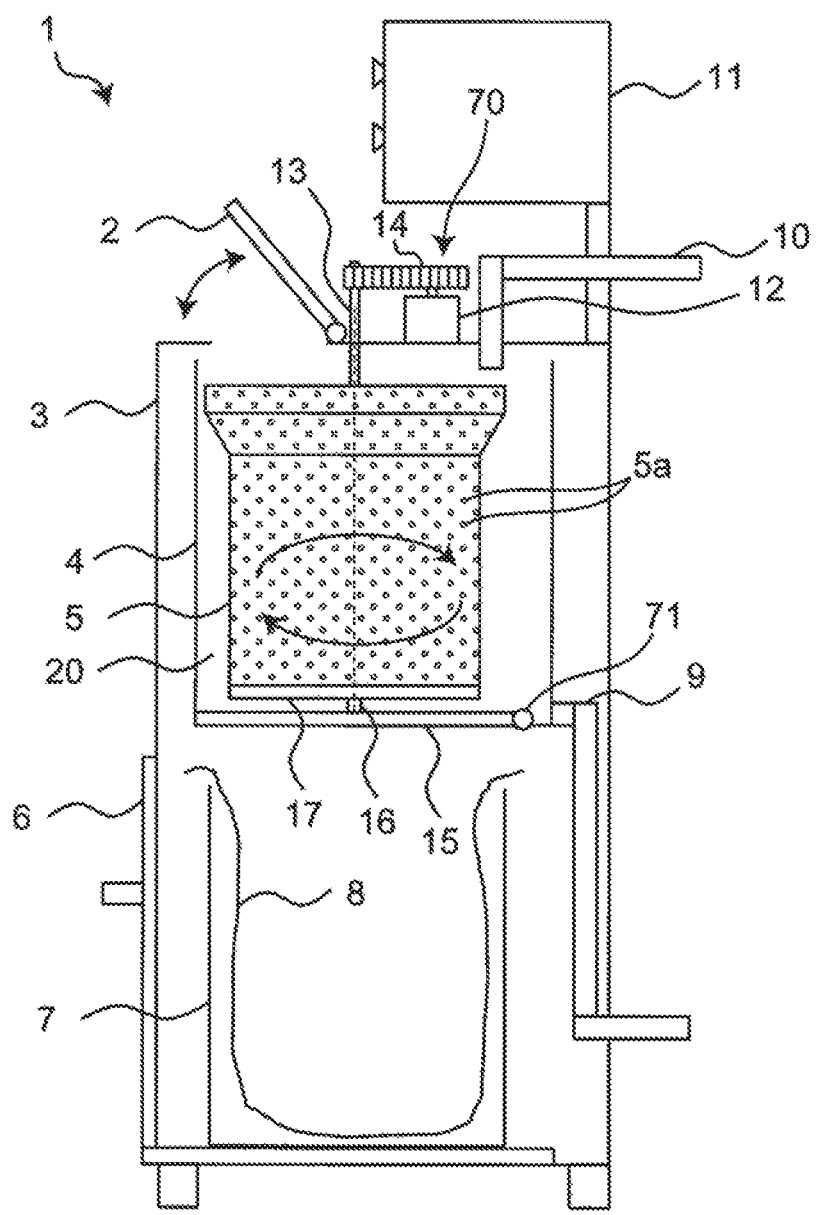
FIG. 4 is a side sectional view showing a configuration of a used paper diaper processing apparatus according to a second embodiment of the present disclosure.

FIG. 4 shows an apparatus configuration of a second embodiment of the present disclosure. A difference from the first embodiment is that the outer tank bottom 15 and the inner tank bottom 17 are connected via a rotation bearing 16 at a rotation center. According to such a configuration, the inner tank bottom 17 can perform opening/closing operation integrally with the outer tank bottom 15 via the rotation bearing 16 with respect to opening/closing operation of the outer tank bottom 15. On the other hand, when the inner tank 5 rotates, the inner tank bottom 17 can be rotated together with the inner tank 5 separately from the outer tank bottom 15 by the rotation bearing 16.

By adopting such a configuration, the inner tank bottom 17 can be opened together simply by opening the outer tank bottom 15, and the used paper diaper 18 can be taken out by the simpler method.

According to the second embodiment described above, the used paper diaper 18 can be taken out by the simpler method.

Third Embodiment

In the first and second embodiments, the inner tank 5 is composed of an inner tank of a vertical drum whose rotation axis coincides with the vertical direction. However, the present disclosure is not limited to this configuration, and a use amount of the processing liquid 19 can be reduced by configuring an inner tank of an oblique drum whose rotation axis is inclined obliquely with respect to the vertical direction.

Figure 5:
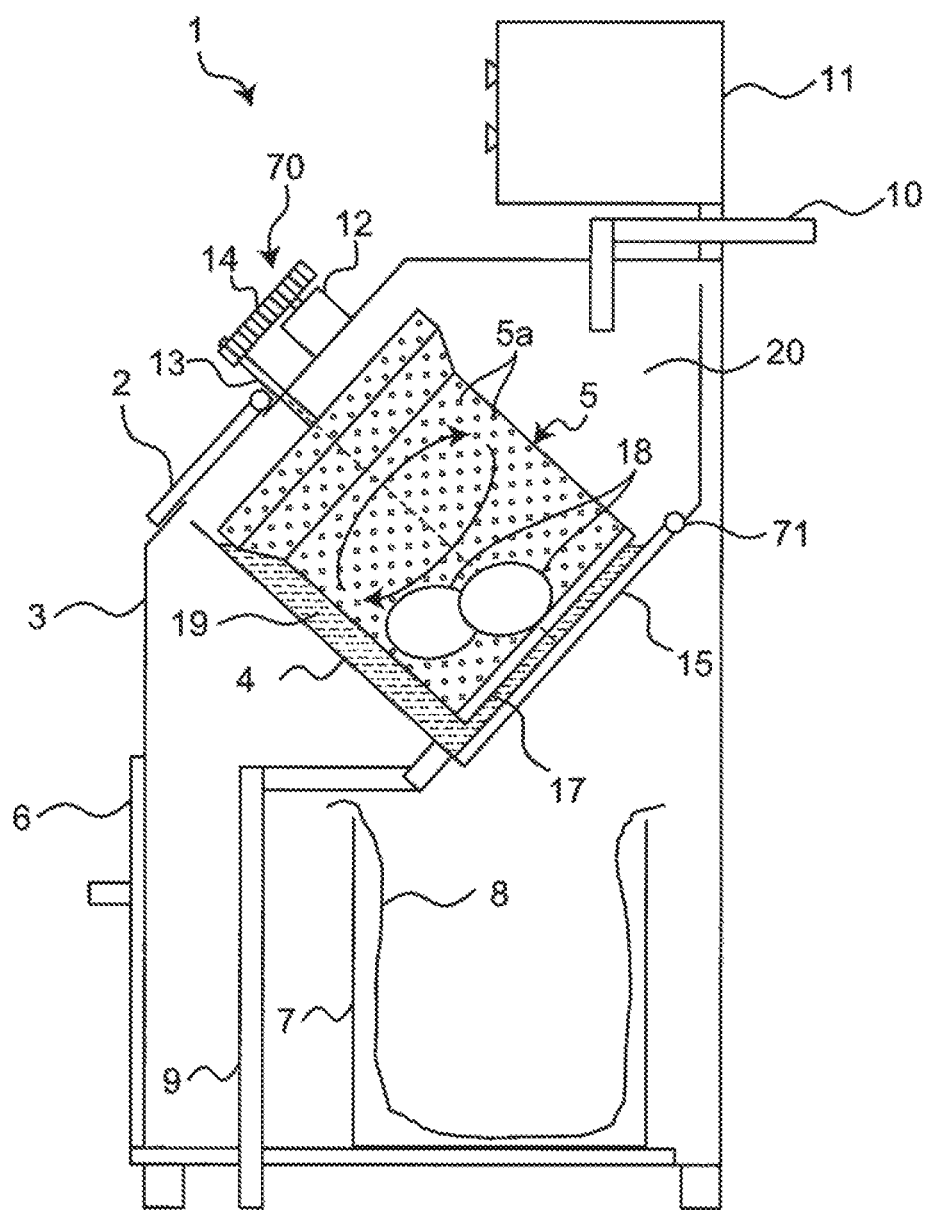
FIG. 5 is a side sectional view showing a configuration of a used paper diaper processing apparatus according to a third embodiment of the present disclosure.
Figure 7A:
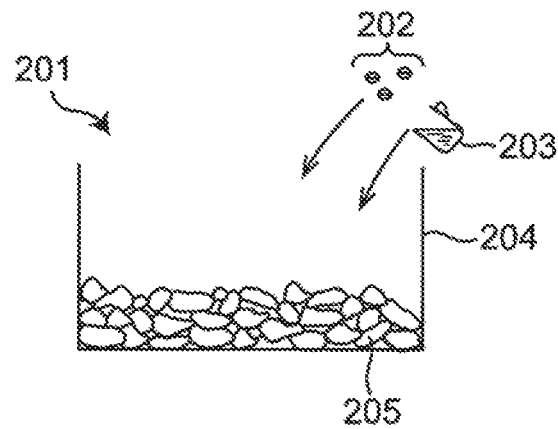
FIGS. 7A-7D are sectional views of a conventional used paper diaper processing apparatus.
Figure 7B:
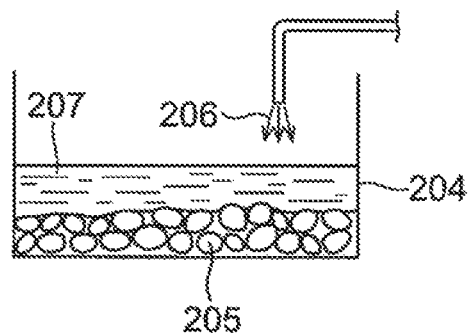
Figure 7C:
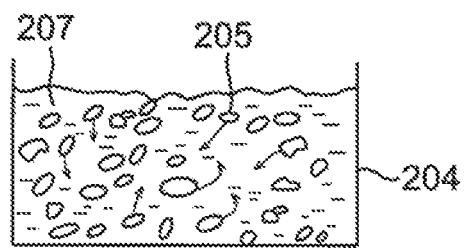
Figure 7D:
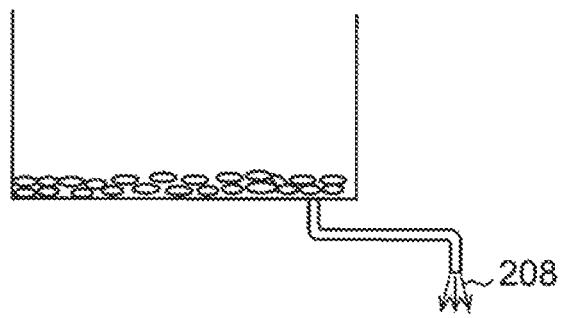

FIG. 5 shows an apparatus configuration of a third embodiment of the present disclosure. A difference from the first embodiment is that the outer tank 4 and the inner tank 5 are inclined obliquely.

By adopting such a configuration, it is possible to secure a water depth in the inner tank 5 with a small amount of the processing liquid 19. Further, since the used paper diaper 18 moves up and down as the inner tank 5 rotates, there is also an effect that stirring with the processing liquid 19 is easily promoted.

Note that a connection configuration between the outer tank bottom 15 and the inner tank bottom 17 may be a configuration in which the outer tank bottom 15 and the inner tank bottom 17 are not connected as shown in FIG. 1, or a configuration in which the outer tank bottom 15 and the inner tank bottom 17 are connected by the rotation bearing 16 as shown in FIG. 4.

As described above, according to the third embodiment described above, the used paper diaper 18 can be processed with a small amount of the processing liquid 19.

Although the embodiments of the present disclosure have been described above, the embodiments are only the illustration for implementing the present disclosure. Therefore, the present disclosure is not limited to the above-described embodiments, and can be implemented by appropriately modifying the embodiments without departing from the spirit thereof.

By appropriately combining arbitrary embodiments or modifications of the above various embodiments or modifications, respective effects can be produced. Additionally, combination between embodiments, combination between working examples, or combination between an embodiment(s) and a working example(s) is possible, and combination between characteristics in different embodiments or working examples is possible as well.

The used paper diaper processing apparatus according to the above aspects of the present disclosure can remove water from the used paper diaper by lowering a water absorption function of a superabsorbent polymer that absorbs water contained in excrement to remove water by mixing the superabsorbent polymer and a chemical containing divalent metal ions, and can reduce weight by lowering an amount of water contained in the used paper diaper. Moreover, the used paper diaper processing apparatus according to the above aspects of the present disclosure does not require an operator to take out the used paper diaper after processing directly from the inner tank. Thereby, the apparatus can reduce work and hygiene burdens on the operator and can be used to improve work in an elderly facility or a childcare facility using large amounts of paper diapers.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A used paper diaper processing apparatus, comprising:
a processing tank that processes a used paper diaper;
a liquid supply unit that supplies a processing liquid to the processing tank;
a liquid discharge unit that discharges the processing liquid from the processing tank; and
a take-out unit that takes out a paper diaper processed in the processing tank below the processing tank,
wherein the processing tank has a cylindrical inner tank that stores the used paper diaper and has a plurality of through holes smaller than the paper diaper on at least either a side surface thereof or a bottom surface thereof, and an outer tank that surrounds the side surface and the bottom surface of the inner tank,
the used paper diaper processing apparatus further comprising:
a rotation drive unit that rotates the inner tank around an axis of the inner tank; and
an opening/closing unit that discharges the paper diaper processed in the processing tank from a bottom of the processing tank to the take-out unit;
wherein in the opening/closing unit, a bottom of the outer tank and a bottom of the inner tank are connected such that they open and close together so that with the bottom of the outer tank and the bottom of the inner tank opened, the paper diaper is discharged out through the opened bottoms of the inner and outer tanks; and
wherein the inner tank is a rotatable vertical drum with a vertical direction thereof as a rotation axis.

2. A used paper diaper processing apparatus, comprising:
a processing tank that processes a used paper diaper;
a liquid supply unit that supplies a processing liquid to the processing tank;
a liquid discharge unit that discharges the processing liquid from the processing tank; and
a take-out unit that takes out a paper diaper processed in the processing tank below the processing tank,
wherein the processing tank has a cylindrical inner tank that stores the used paper diaper and has a plurality of through holes smaller than the paper diaper on at least either a side surface thereof or a bottom surface thereof, and an outer tank that surrounds the side surface and the bottom surface of the inner tank,
the used paper diaper processing apparatus further comprising:
a rotation drive unit that rotates the inner tank around an axis of the inner tank; and
an opening/closing unit that discharges the paper diaper processed in the processing tank from a bottom of the processing tank to the take-out unit;
wherein in the opening/closing unit, a bottom of the outer tank and a bottom of the inner tank are connected such that they open and close together so that with the bottom of the outer tank and the bottom of the inner tank opened, the paper diaper is discharged out through the opened bottoms of the inner and outer tanks;

wherein the inner tank is a rotatable oblique drum with an oblique direction with respect to a vertical direction thereof as a rotation axis.

\* \* \* \* \*